Patented Oct. 17, 1939

2,176,430

UNITED STATES PATENT OFFICE 2,176,430

VAT-DYESTUFFS OF THE ANTHRAQUINONE SERIES

Georg Kränzlein, Martin Corell, and Bernhard Popp, Frankfort-on-the-Main, Germany, assignors to General Aniline Works, Inc., New York, N. Y., a corporation of Delaware No Drawing. Application April 5, 1938, Serial No. 200,126. In Germany April 9, 1937

5 Claims. (Cl. 260—316)

The present invention relates to vat-dyestuffs of the anthraquinone series.

We have found that 1.3-di-(anthraquinonylamino)-4.6-dinitrobenzene compounds of the following constitution:—

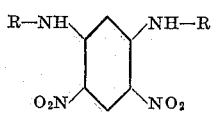

wherein R represents an anthraquinone radical which may contain substituents, may be transformed into very intense and very fast vat-dyestuffs by reducing the two nitro-groups in the compounds to amino-groups and by transforming the 1.3-di-(anthraquinonylamino)-4.6-di-aminobenzene compounds thus obtained, by way of the azimino compounds, in known manner into the dicarbazoles corresponding with the following formula:

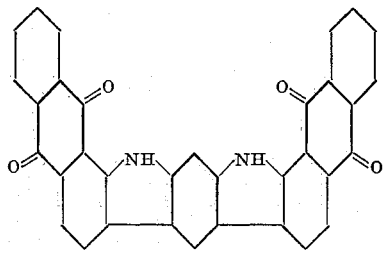

wherein the anthraquinone radicals may contain substituents as, for instance, chlorine, methoxy, phenylamino or benzoylamino. In some cases, it will be of advantage to brominate the compound.

The dicarbazoles obtained according to the present invention are vat-dyestuffs which dye the vegetable fiber very intense scarlet, brown and violet tints. They have very good properties of fastness, especially a good fastness to boiling with sodium carbonate and to light. This result is surprising since the simple phthaloyl-carbazoles, for instance those of the following formula:

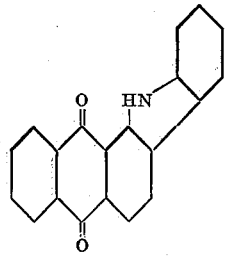

yield, in a vat, very feeble dyeings.

The following examples serve to illustrate the invention, but they are not intended to limit it thereto, the parts being by weight:

1. At 120° C. to 130° C., 45.6 parts of 1.3-di-(alpha-anthraquinonylamino)-4.6-dinitrobenzene in 600 parts of chlorobenzene are reduced by means of hydrogen, in the presence of 5 per cent. of a nickel catalyst. After cooling, the product is filtered with suction and the diamine is recrystallized from nitro-benzene. The pure amine melts at 346° C. to 348° C. It dissolves in concentrated sulfuric acid to a blue solution.

31.5 parts of the 1.3-di-(alpha-anthraquinonylamino)-4.6-diaminobenzene thus obtained, 500 parts of glacial acetic acid and 132 parts of amyl nitrite are heated to boiling, for one hour, in a reflux apparatus. After cooling, the whole is filtered with suction and the yellow azimino compound is recrystallized from nitrobenzene. It dissolves in sulfuric acid to a yellow solution and melts at 335° C.

29 parts of the azimino compound melting at 335° C. are mixed with 290 parts of diphenylamine and the mixture is heated to boiling for 10 minutes, while well stirring. A temporary solution is formed and nitrogen escapes; the dyestuff formed then separates in the form of a thick mass. The suspension is diluted with alcohol, while hot, and is filtered with suction. After extraction with boiling nitrobenzene, in which the dyestuff is not soluble, the latter remains in the form of a red-brown, crystalline powder. It dissolves in concentrated sulfuric acid to a blue solution and melts at 440° C. The dyestuff has the following constitution:

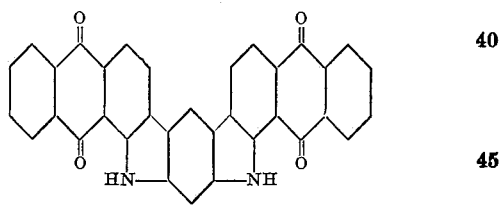

It dyes cotton, from an orange vat, red-brown tints of very good fastness to washing, to boiling with sodium carbonate and to chlorine.

The 1.3-di-(alpha-anthraquinonylamino)-4.6-dinitrobenzene used as a starting material may be prepared in the following manner: A mixture of

| | Parts |
|---|---|
| 1-aminoanthraquinone | 90 |
| 1.3-dichloro-4.6-dinitrobenzene melting at 102–103° C | 49 |
| Sodium carbonate | 22.5 |
| Copper acetate | 1.2 |
| Copper powder | 1.2 |
| Nitrobenzene | 900 | is boiled for 10 to 12 hours. After cooling, the whole is filtered with suction, the solid matter is washed by means of hot alcohol, extracted by boiling with water and dried. The new compound is obtained with a yield of 83 parts and melts at 360° C.; its solution in concentrated sulfuric acid is green; it is free from chlorine; it crystallizes from nitrobenzene in the form of yellow-brown needles.

2. 10 parts of the dyestuff obtained as described in Example 1 are heated at 160° C. to 165° C. in 200 parts of nitrobenzene together with 1 part of iodine and 7.5 parts of bromine. After the bromination is terminated, the whole is filtered with suction, at a temperature between 100° C. and 110° C. and washed with warm nitrobenzene and hot alcohol. A dibrominated dyestuff is thus obtained which dyes the material, in an orange vat, orange tints having very good properties of fastness.

3. 42.4 parts of 1.3-di-(5'-benzoylamino-1'-anthraquinonylamino)-4.6-dinitrobenzene melting at 384° C. and obtainable, for instance, in a manner analogous to that described in the last paragraph of Example 1 form 2 molecular proportions of 1-amino-5-benzoylamino-anthraquinone and 1 molecular proportion of 1.3-dichloro-4.6-dinitrobenzene, are reduced, by means of hydrogen, in 400 parts of chlorobenzene in the presence of 5 per cent. of a nickel catalyst, at a temperature of 100° C. After recrystallizing it from trichlorobenzene, a diamine is obtained which crystallizes in the form of violet needles and dissolves in concentrated sulfuric acid to a green solution.

22 parts of the amine obtained are boiled with 300 parts of glacial acetic acid and 88 parts of amyl nitrite until yellow crystals of the azimino compound separate. It is a yellow crystalline powder which dissolves in concentrated sulfuric acid to a yellow solution.

19.5 parts of this azimino compound are boiled with 195 parts of diphenylamine. With evolution of nitrogen, the dyestuff separates after a short time. It dissolves in concentrated sulfuric acid to a blue solution and it dyes cotton, in a red-brown vat, red-brown tints of very good properties of fastness, especially of very good fastness to light. The dyestuff has the following constitution:

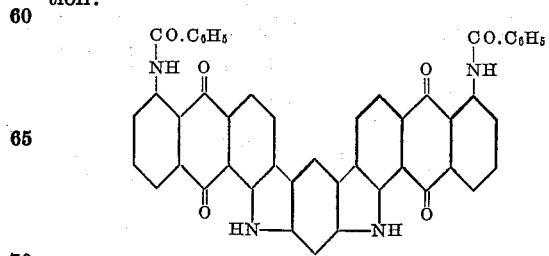

4. 23.7 parts of 1.3-di-(4'-phenylamino-1'-anthraquinonylamino)-4.6-dinitrobenzene obtainable, for instance, in a manner analogous to that described in the last paragraph of Example 1 from 2 molecular proportions of 1-amino-4-anilidoanthraquinone and 1 molecular proportion of 1.3-dichloro-4.6-dinitrobenzene, are reduced by means of hydrogen, in 200 parts of chlorobenzene, in the presence of 5 per cent. of a nickel catalyst and at a temperature of 100° C. After recrystallization from trichlorobenzene the amine melts at 306° C. to 308° C. It dissolves in concentrated sulfuric acid to a green-blue solution.

7 parts of this amine are heated to boiling, for a short time, with 100 parts of glacial acetic acid and 20 parts of amyl nitrite. The yellow azimino compound separates, on cooling. After filtration with suction and drying, the azimino compound is boiled with 68 parts of diphenylamine. The dyestuff only separates on dilution with alcohol. It is filtered with suction and dried. The dyestuff is a grey crystalline powder which dyes cotton, from an orange vat, grey tints of good properties of fastness. The dyestuff has the following constitution:

We claim:

1. The compounds of the general formula:

wherein Y represents a member of the group consisting of hydrogen and bromine, $X_1$ and $X_2$ represent members of the group consisting of hydrogen, chlorine, —$OCH_3$, —$NH.C_6H_5$ and —$NH.COC_6H_5$, the compounds being symmetrical about the central benzene ring.

2. The compounds of the general formula:

wherein $X_1$ and $X_2$ represent members of the group consisting of hydrogen, chlorine, —$OCH_3$, —$NH.C_6H_5$ and —$NH.COC_6H_5$, the compounds being symmetrical about the central benzene ring.

3. The compound of the formula:

which forms a red-brown, crystalline powder, insoluble in nitrobenzene, and dissolves in concentrated sulfuric acid to a blue solution, melts at 440° C. and dyes cotton, from an orange vat, red-brown tints of very good fastness to washing, to boiling with sodium carbonate and to chlorine.

4. The compound of the formula:

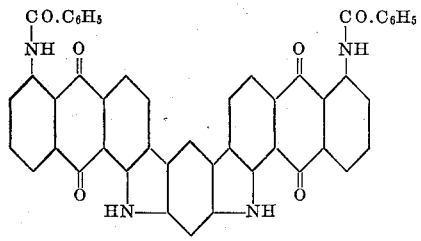

which dissolves in concentrated sulfuric acid to a blue solution and dyes cotton, in a red-brown vat, red-brown tints of very good properties of fastness, especially of very good fastness to light.

5. The compound of the formula:

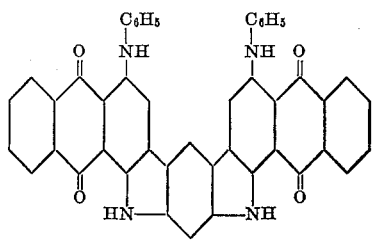

which a grey crystalline powder and dyes cotton, from an orange vat, grey tints of good properties of fastness.

GEORG KRÄNZLEIN.
MARTIN CORELL.
BERNHARD POPP.